Oct. 11, 1927.

F. A. RAPPLEYE 1,645,402

SEPARATING AND GRADING MACHINE

Filed Nov. 11, 1924

INVENTOR.
Frank A. Rappleye,
by Parker, Rockwood & Bean
ATTORNEYS.

Oct. 11, 1927. 1,645,402
F. A. RAPPLEYE
SEPARATING AND GRADING MACHINE
Filed Nov. 11, 1924 4 Sheets-Sheet 2

INVENTOR.
Frank A. Rappleye
By
Parker, Rockwood & Bean
ATTORNEYS.

Oct. 11, 1927.

F. A. RAPPLEYE 1,645,402

SEPARATING AND GRADING MACHINE

Filed Nov. 11, 1924

INVENTOR.
Frank A. Rappleye
By Parker, Rockwood & Bean,
ATTORNEYS.

Patented Oct. 11, 1927.

1,645,402

UNITED STATES PATENT OFFICE.

FRANK A. RAPPLEYE, OF SILVER CREEK, NEW YORK.

SEPARATING AND GRADING MACHINE.

Application filed November 11, 1924. Serial No. 749,189.

This invention relates to separating and grading machines and more particularly to machines for separating foreign matter such as lumps of dirt, small stones and trash from materials such as beans, and grading the materials simultaneously with the separating action.

An object of this invention is to provide a machine of this sort of improved construction adapted to separate the foreign material from beans or other seeds, fruits or commodities, and also to grade or sort beans or articles when desired and accomplish these results in a superior manner and so as to effect the separation of foreign material from such commodities with a minimum loss therefrom.

Another object is to provide novel means for accomplishing the separating of the foreign matter from the beans or other articles including a rotatable roll which cooperates with an endless apron or conveyor in such a manner that the rotatable roll will agitate the material being acted upon and throw it towards and upon the separating apron; also to arrange said roll and apron so that an inclined trough is formed between them, and to provide an apron of such character that when the beans and foreign matter or material are agitated and thrown towards it by the roll, the apron will retain the foreign particles by the cohesion of the particles with its surface and discharge them from the machine in one direction, while the beans or other materials will be returned from the apron to the inclined trough and be discharged therefrom.

Still further objects of the invention are to construct a machine of this sort having improved adjusting means for the rotatable roll, whereby the discharge opening in the trough formed between the roll and apron may be varied in width from one end of the trough to the other to effect a grading of the beans or other articles being separated; also to provide means for adjusting the apron so that it may be inclined more or less in two directions so as to enable the beans or other smooth objects or materials when carried from the trough by the apron to roll obliquely thereon due to said inclined arrangement, so that each time the materials are thrown upon the apron and returned to the trough, the materials will be carried farther towards the lower or discharge end of the trough; also to provide improved means, cooperating with the separating means of the machine, for effecting a preliminary crushing action on lumps of dirt or the like to aid in a more complete separation of foreign matter from the material; also to improve a machine of this sort in the other respects hereinafter described and set forth in the claims.

In the embodiment of the invention illustrated in the drawings, a stationary main frame 10 is provided including corner posts 11, end cross rails 12 and top and bottom side rails 13 and 14.

An adjustable frame 15 comprising front and rear rails or members 16 and opposite side rails 17 is arranged at the upper end of the frame 10, the movable frame being preferably pivotally supported on a transverse central shaft 18 supported at its opposite ends in brackets 19 secured on the top rails 13. This adjustable frame 15 is adapted to support the separating means, which includes a roll 20 extending longitudinally of the machine, and an endless apron or conveyor 21, which is adapted to pass around longitudinal rolls 22, 23, the roll 22 being arranged alongside or close to the roll 20 so as to form a trough 24 between the roll 20 and that portion of the apron 21 which passes over the roll 22. The roll 20 and apron roll 22 are supported on the frame 15 in bearings 25, 26 mounted on the rails 16 thereon, while the apron roll 23 is journalled in bearings 27 on the outer ends of tension members or devices 28. The tension members are pivotally mounted and are adapted to oscillate on the axis of the roll 22 so that the apron 21 may be inclined at different angles with reference to the trough 24. For this purpose the tension members 28 are provided at their inner ends with forked portions 29 which straddle the bearings 26 and are apertured to receive the reduced ends 22$^a$ of the roll 22. The members 28 are made adjustable to enable the roll 23 to be moved relatively to the roll 22 for the purpose of taking up any slack in the apron, and each member 28 is provided with a screw rod 31, having threaded engagement in, and extending from the portion 29, and at the outer end of which rod is swivelled another bifurcated member 32 in which the bearing 27 for the roll 23 is pivotally mounted as by means of pivot studs 34 arranged on a line which is perpendicular to the axis of the rod 31 and the axis of the roll 23. By turning the rods 31 the bearings 27 may be moved away from the roll 22 so as to tighten or increase the tension of the apron 21, and by providing the separately adjustable tension members and the pivotal connections 34 for the bearings 27, either one of these bearings may be moved a greater distance from the axis of the roll 22 than the other bearing, thereby allowing the apron to be tightened under conditions where one side is more slack than the other, without causing any binding of the apron rolls in their bearings.

Figure 6:
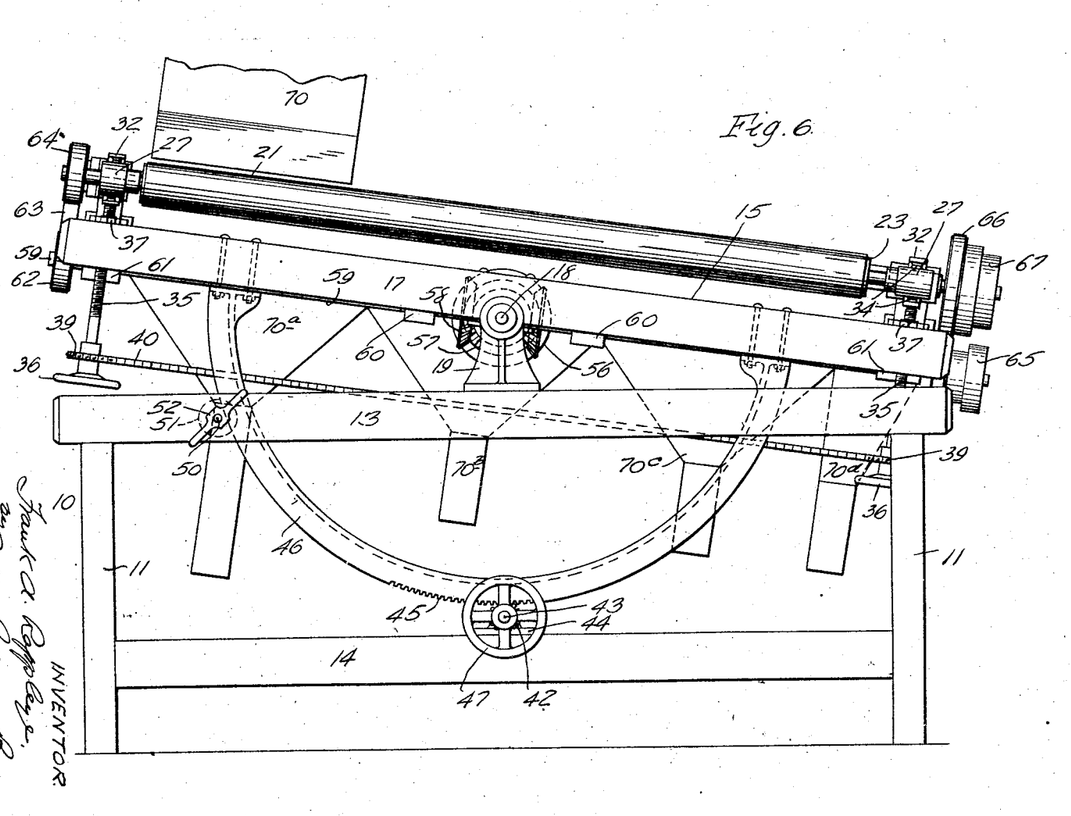
Fig. 6 is a side elevation of the machine.

The means for adjusting or tilting the apron 21 preferably comprises a pair of adjusting screws 35, each of which is adapted to have verticaal endwise movements in a hole in one of the members 16 of the frame 15 so that its upper end may bear against and support the outer end of the adjustable tension member 28 at that side of the machine, such as by engaging beneath the bifurcated end 32. Each of the adjusting screws is provided at its lower end with a hand wheel 36 for turning it so as to raise or lower the upper or outer end of the apron 21. The screw may be held in any position to which it may be turned by means of the lock nut 37. The weight of the tension members is sufficient to maintain these members in contact with the screws 35 at all times. As shown, particularly in Fig. 6, the hand screws are provided with means whereby they are connected so as to operate simultaneously with each other, whereby the oscillation of the tension frames 28 or tilting of the apron 21 may be effected from either end of the machine. For this purpose, each of the screws is provided with a sprocket 39 fixed, for example, on the hub of its hand wheel 36, the sprocket wheels 39 being connected by a sprocket chain 40, so that by turning either hand wheel both screws 35 will be rotated. Any other suitable means may be provided for effecting the simultaneous adjustment of the screws 35.

In addition to the described arrangement which permits the inclination of the apron to be varied, means are provided for rocking or oscillating the adjustable frame 15 as a whole on its pivot 18 in a direction at right angles to the direction of movement just described for the apron, whereby the apron 21 and the roll 20 may be tilted or inclined downwardly more or less from front to rear or longitudinally of the machine so as to provide the proper inclination of the trough 24 according to the kind of material, or grade or condition of the articles being acted upon.

The means shown in the drawing for this purpose comprise a pinion 42 secured on a shaft 43 journalled in bearings 44 on the side rails 14 of the main frame 10, said pinion 42 being adapted to mesh with gear teeth 45 formed on an arcuate bracket member or bar 46 fixed to the underside of one of the rails 17 of the adjusting frame and extending downwardly therefrom, preferably adjacent to the inner face of one of the side rails 13 of the main frame 10. The outer end of the shaft 43 is provided with a hand wheel 47 for rotating the shaft 43 and pinion 42 to rock the frame 15 on its pivot in one direction or another to cause a greater or less longitudinal inclination of the separating trough 24 and the upper run or separating surface of the apron 21. After the necessary adjustment has been effected, the frame 15 may be secured in its adjusted position by clamping the flange of the bracket 46 against the inner face of the side rail 13, as by a locking screw 50, passing through the rail and having a head 51 on one end engaging the flange and a wing nut 52 on the other end adapted to draw the head against the bar. Any other suitable holding or locking means may be provided.

The means provided for rotating the roll 20, and the roll 22 for actuating the apron 21 are preferably arranged as follows:—

Figures 4, 5:
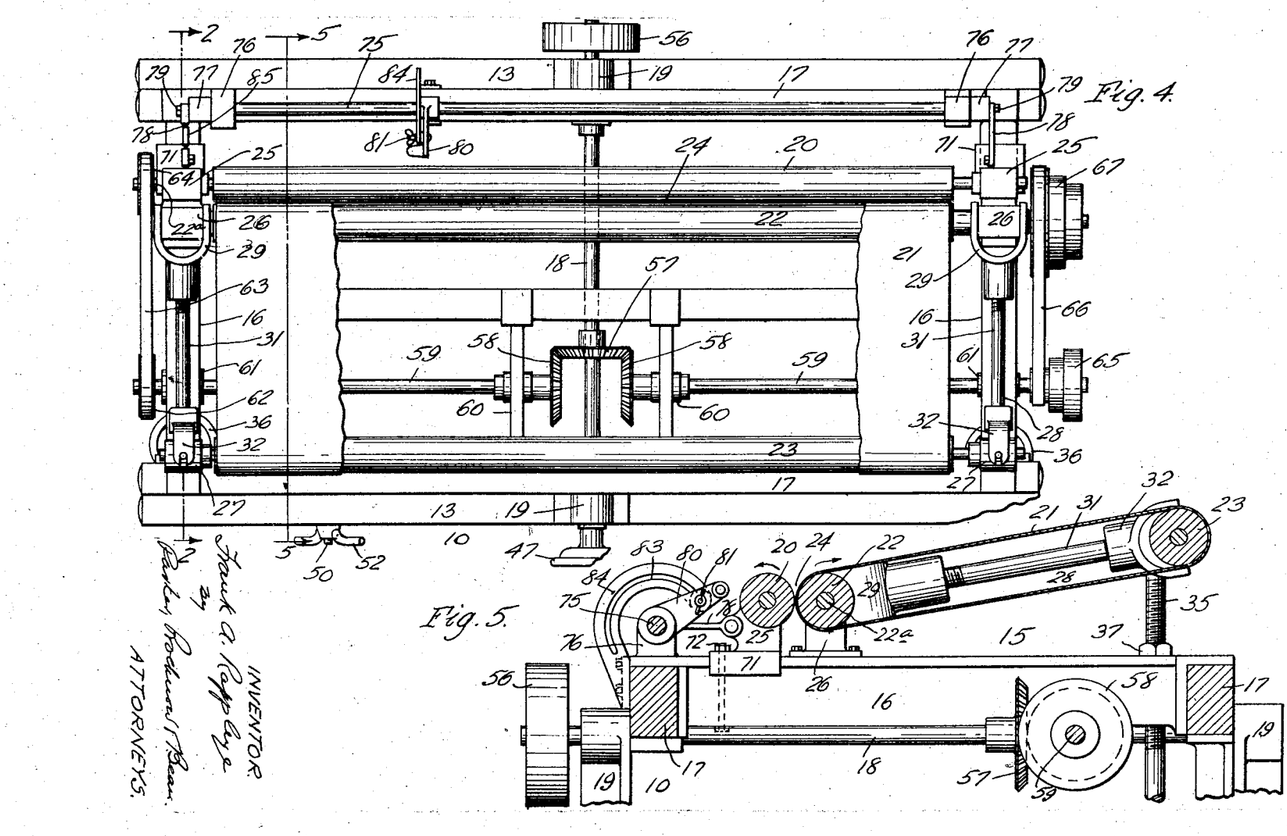
Fig. 4 is a plan view of the machine with a portion of the apron broken away to show the parts beneath.
Fig. 5 is a transverse sectional elevation thereof on line 5—5, Fig. 4.

The shaft 18 before mentioned is adapted to be rotated by a pulley 56 and secured on the shaft, see Figs. 4–7, is a bevel gear 57 adapted to mesh with oppositely disposed bevel pinions 58 arranged at opposite sides of the shaft 18. These pinions are secured to the inner end of horizontal shafts 59 extending at right angles to the shaft 18 towards the opposite ends of the machine, said shafts being journalled in inner and outer bearings 60 and 61 respectively. One of the shafts 59, for instance the left hand shaft in Fig. 4 is provided at its outer end with a pulley 62, which is connected by means of a belt 63 to a pulley 64 on one end of the roll 20. The other shaft 59 is provided on its outer end with a pulley 65 which is adapted to drive the roll 22 for the apron 21 by means of a belt 66 and pulley 67. It is desirable that this roll 22 may be rotated at different speeds so that different speeds may be provided for the apron 21 relative to the speed of the roll 20. For this purpose, the pulleys 65 and 67 are in the form of step pulleys having portions of different diameters and by moving the belt 66 from one to the other of these portions on the two pulleys, the apron 21 can be driven at the desired speed. The described driving means are relatively simple and are easily accessible, and provide a positive rotation of the rolls 20, 22 from the single drive shaft 59.

It is well known that small particles or objects will adhere more or less to the surface with which they come into contact, according to their texture and also according to their degree of roughness or smoothness, or the texture of such surface. In the present invention, this principle is made use of to effect the separation of the foreign matter from the beans or articles. For this purpose the roll 20 is made with a surface which is adapted to repel the material or prevent any of the foreign or other matter from adhering thereto. In the present construction the roll is smooth and formed of metal or other material having the required texture, while the apron 21 is formed of cotton or other textile fabric having a relatively rough surface such that roughened particles will cling more or less thereto. The rolls 20, 22 rotate in opposite directions upwardly and outwardly away from the bottom of the trough, and these two rolls are adapted to be driven at different speeds, the roll 20 preferably rotating considerably faster than the roll 22 and apron 21 this being accomplished by making the pulleys before mentioned of different diameters as shown. As before stated, the rolls are inclined by tilting the adjustable frame 15 so that the trough inclines downwardly from the front to the rear of the machine. In the present instance, the front end of the machine is the receiving end, the material to be acted upon being presented to the rolls from a hopper 70 or the like which may be fixed to the frame 15, or suspended above the machine as desired. By the relatively greater speed of rotation of the roll 20, this roll acts on the material deposited in the trough 24 in a manner to agitate it and throw it towards the other roll 22, or against the upwardly moving portion of the apron forming the opposite side of the trough, and the rough particles of foreign matter, such as lumps of dried mud, small stones or grit, straw and the like mixed with the beans or other articles cling to the apron and are carried away from the trough on the apron and moved toward the outer end thereof and discharged therefrom, while the beans or other articles having a relatively smooth surface will not cling to the apron and will roll back into the trough, and as the trough is inclined downwardly away from the hopper 70, the beans will be gradually carried to and discharged from the lower end of the trough. The particular advantage of using an apron for this purpose instead of a roll covered with roughened material as in some previous constructions is that a greater saving of desirable material or beans is effected, than is the case in such other constructions, for in those constructions, some at least of the beans are carried to the high point of the roughened roll and are consequently discharged over the outer side of such roll with the foreign particles which it is desired to separate from the beans, but in the present instance, the beans are all returned to the trough, even though they are carried a considerable distance upwardly on the apron as the movement of the apron and the natural tendency of round, smooth beans to roll down an inclination cause the beans to travel obliquely down over the surface of the apron, and they will all eventually be discharged from the trough.

The condition of the beans or other articles to be separated is often such that a number of different sizes of the articles are present in a particular batch, and it is desirable to grade these various sizes so that they may be discharged into separate hoppers or receptacles simultaneously with the separation of the foreign material therefrom. This grading is often accomplished by spacing the rolls forming the trough so that their axes are disposed in angular relation to each other, thus providing a space of gradually increasing width between them, preferably with the narrowest portion of the opening adjacent the feed end of the trough, so that any particles of dust and dirt received in the trough from the feed hopper 70 will pass through this space, which is too narrow to permit the beans to drop through, and the dirt may be discharged either into a separate compartment as shown at 70$^a$ or only with the defectve or broken beans or articles, while the better grades are separated by passing through the gradually increasing space between the rolls towards the discharge end of the trough. These grades of beans are received into discharge hoppers 70$^b$, 70$^c$ and 70$^d$.

Figure 1:
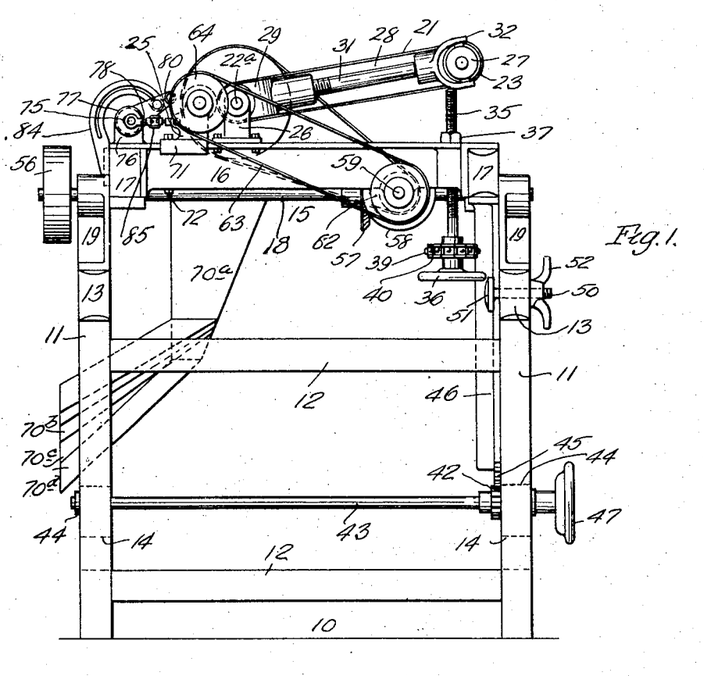
Fig. 1 is an elevation of the front or feed end of a machine embodying my invention.
Figures 2, 3:
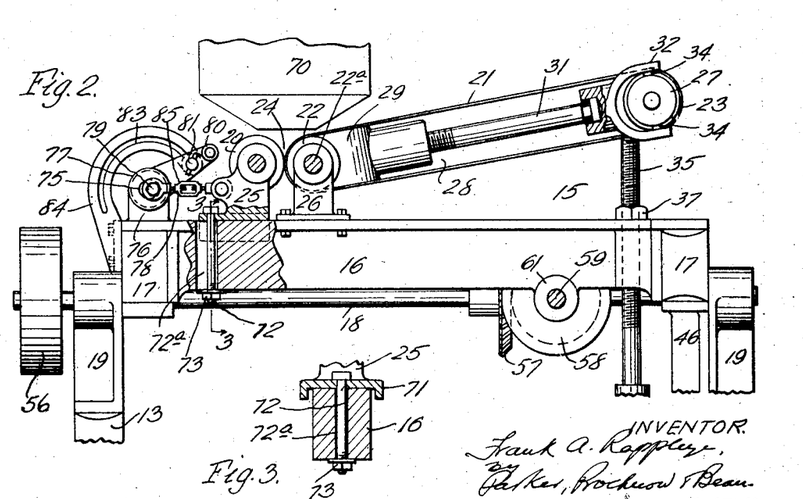
Fig. 2 is a fragmentary sectional elevation thereof on an enlarged scale on line 2—2, Fig. 4.
Fig. 3 is a fragmentary detail view of part of the machine on line 3—3, Fig. 2.

Means of improved construction are provided in accordance with the present invention for effecting the angular adjustment of one of the rolls 20, 22 relatively to the other to form the tapered space between them. As shown in the drawings, see Figs. 2–5 the bearings 25 for the roll 20 are slidably arranged on the rails 16 of the frame 15 to move towards and from the roll 22. Each bearing is provided with a shoe 71 which straddles the rail, and a bolt 72 passing downwardly through a hole in the shoe and through a slot 72ᵃ in the rail permits the bearing, when the nut 73 on the bolt is loosened, to be moved a limited distance along the rail. This movement is effected by means of a rock shaft 75 which extends longitudinally of the machine and parallel with the roll 20 and is journalled in end bearings 76 on the adjustable frame. A crank disk 77 is fixed to each end of the rock shaft and a link 78 is pivotally connected to each disk 77 and to one of the bearings 25. The pivot 79 connecting each link to its disk 77 is arranged eccentrically relatively to the axis of the rock shaft 75 and when disposed at the right hand side thereof as in Fig. 2, the roll 20 is substantially in contact with or close to the apron 21. By loosening bolts 72 and rotating the rock shaft 75 to move the pivot 79 towards the left, the bearings 25 will be permitted to slide on the rails 16 and move the roll 20 away from the apron 21, but with its axis still parallel with the axis of roll 22.

The rock shaft is provided with a handle 80 for turning it, and the handle is adapted to be locked to hold the shaft in its adjusted positions by a bolt 81 passing through the handle into an arcuate slot 83 in a bracket 84 fixed on the frame 15, the slot being curved concentrically with the axis of the rock shaft. One of the links 78, for instance the link at the front end of the machine is made extensible as by a turnbuckle 85. When therefore it is desired to effect an angular adjustment of roll 20 relatively to the roll 22, for instance to widen the opening at the bottom of trough 24 toward the rear end of the machine, the rock shaft 75 is rotated to move the bearings 25 the desired distance, and the rock shaft is secured in this position by the lock bolt 81, after which the turnbuckle 85 is adjusted to lengthen the link and move the bearing 25 to which it is connected and also the adjacent end of roll 20 towards the roll 22 until the desired adjustment is effected. The bolts 72 are now tightened to retain the roll 20 in this position. There is sufficient play between the bearing shoes 71 and the sides of the rails 16 to allow the bearings to turn slightly on the bolts 72 to avoid binding of the ends of the roll 20 in its bearings when the angular adjustments thereof are made.

Figure 7:
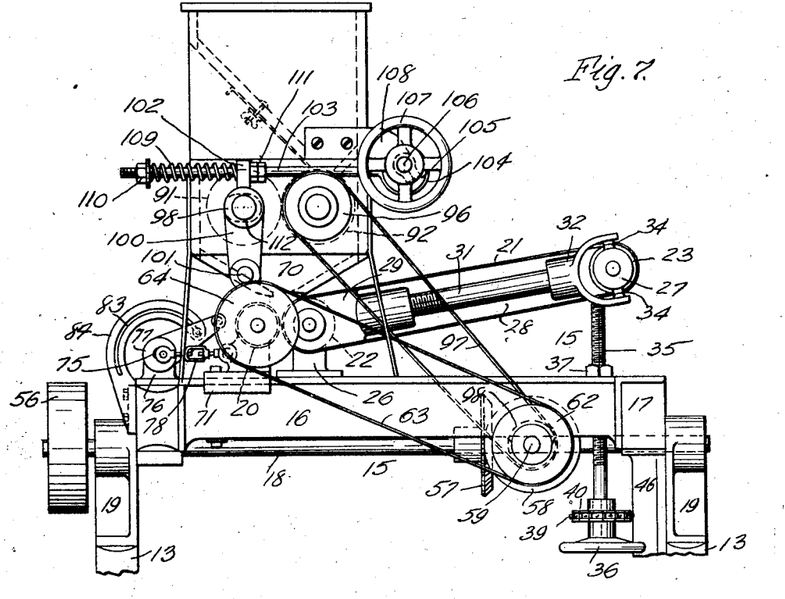
Fig. 7 is a fragmentary elevation of the front end of a machine of slightly modified construction showing precrushing or precleaning means arranged in connection with the feed hopper.
Figure 8:
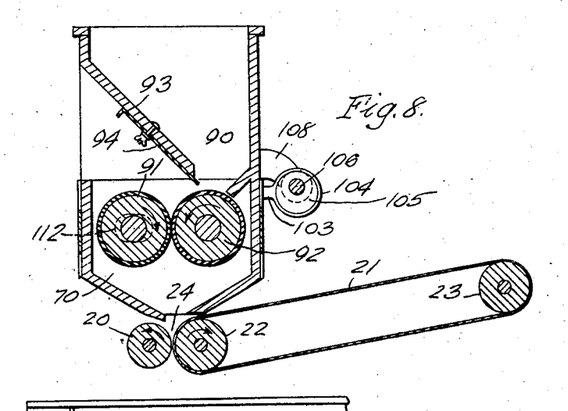
Fig. 8 is a transverse sectional elevation of the precrushing means.

The means shown in the drawings whereby the preliminary separating of the foreign material, such as lumps of dried mud and the like is effected is in the form of a precrusher 90 arranged in the hopper 70 above the feed end of the trough 24, and is adapted to receive the material to be separated and to act to crush the lumps of dirt and other relatively large particles before they pass to the separating means proper. By crushing the lumps of mud into fine particles they will separate from the beans and large solid particles and will readily drop through the space at the bottom of the trough below the hopper and be at once eliminated from the machine, thereby leaving the separating means free to act on the beans and the larger particles of foreign material. As shown in Figs. 7 and 8, the precrusher comprises a pair of rubber covered rolls 91, 92 arranged with their axes parallel and so that they are substantially in engagement with one another and are adapted to revolve toward each other in such a manner that material deposited on them will be passed forcibly between the rolls, so that while the lumps of dirt will be crushed thereby the beans and other hard materials will pass through without change. The material when placed into the upper part of the hopper 90 engages an inclined shelf 93 having at its lower end an adjustable plate 94 adapted to be moved toward and from the roll 92 to vary the distance between said lower edge and this roll, and thereby control the amount of material passing to and between the rolls according to the quality or the size of the articles being acted upon. The rolls 91, 92 may be rotated by any suitable means, but preferably one of the rolls, for instance, the roll 92, is provided with a pulley 96 connected by a belt 97 to a pulley 98 on the shaft 59 before mentioned for rotating the roll 92 which in turn, by its frictional contact with the roll 91 rotates the same in the opposite direction.

Means are preferably provided for varying the pressure between the rolls, such means in the construction shown including adjustable bearings 98 at the opposite ends of the roll 91 and which are provided with depending lugs 100, pivoted at 101 at a distance below the axis of the shaft so that the roll 91 may be adapted to move toward and from the roll 92. The bearings 98 are each provided with an upwardly projecting lug 102 through which an adjusting rod 103 extends and which is provided at one end with a strap 104 passing around an eccentric 105 on an operating shaft 106 which is adapted to be turned by a hand wheel 107. The shaft 106 is journalled in bearings 108 on the hopper. By turning the hand wheel to rotate the shaft 106, the eccentrics 105 are caused to move the adjusting rods 103 so as to shift the bearings 98 and roll 91 towards or from the roll 92, thereby varying the pressure between the rubber surfaces of the two rolls. The adjusting devices are further provided with yielding means adapted to permit the roll 91 to move away from the roll 92 should an unusually large obstruction pass between them to thereby prevent damage to the rolls or the inadvertent stopping of the machine. This is acomplished by arranging a coil spring 109 around each adjusting rod 103 so as to be held in engagement with the lug 102 as by means of a nut and washer 110, while the other side of the lug 102 is engaged by nuts 111 which form a stop against which the lug is yieldingly pressed by the spring 109. Should a relatively large obstruction pass between the rolls, an outward pressure would be exerted on the roll 91, which would be transmitted to the lugs 102 through the bearings 99, and the roll is thus enabled to move outwardly against the action of the spring 109 and allow the obstruction to pass. The side walls of the hopper 70 are slotted at 112 to permit the necessary movements of the roll 91.

I claim as my invention:—

1. In a separator of the character described, a pair of movable surfaces adapted to form a separating trough therebetween, one of said surfaces being formed by a substantially smooth rotatable roll, and the other surface being formed by a relatively rough surfaced endless apron adapted to move upwardly through an arc adjacent said roll and thence along an upwardly inclined path.

2. In a separator of the character described, a pair of movable surfaces disposed adjacent and parallel to each other and inclined so as to form a separating trough therebetween, one of said surfaces being in the form of a smooth rotatable roll, and the other surface comprising a relatively rough surfaced endless apron, said smooth surfaced roll being adapted to move at a greater speed than said rough surfaced apron to throw material in said trough against said apron, and the surface of said apron being adapted to retain and separate the rough matter from said material, and said surfaces being arranged to move upwardly away from each other with respect to said trough.

3. In a separator of the character described, a pair of movable surfaces disposed adjacent and parallel to each other and inclined so as to form a downwardly directed trough therebetween, one of said surfaces being in the form of a smooth rotatable roll, and the other surface being formed by an endless apron having a relatively rough surface, said smooth surface being adapted to move upwardly and at a greater speed than said rough surface to repel the material in said trough and throw the same against said apron, said apron being arranged to move upwardly through an arc and thence along an upwardly inclined path, so that the rough matter in said material will be retained by said rough apron surface and smooth objects will roll down its inclined surface and return to said trough.

4. In a separator of the character described, a smooth rotatable surface adapted to repel material engaged thereby and disposed adjacent a relatively rough surface formed by an end of the upper run of a movable endless apron, said surfaces being inclined to form a downwardly directed trough to which the material is fed, said surfaces being arranged to move upwardly away from each other with reference to said trough, whereby said smooth rotatable surface is adapted to repel said material in said trough and move the same against said apron, and said apron is adapted to carry the rough matter in the material away from said trough and return smooth objects to said trough towards the discharge end thereof.

5. In a separator of the character described a smooth rotatable surface adapted to repel material engaged thereby and disposed adjacent a relatively rough surface formed by an end of the upper run of a movable endless apron, said surfaces being inclined to form a downwardly directed trough to which the material is fed, said surfaces being arranged to move upwardly away from each other with reference to said trough, whereby said smooth rotatable surface is adapted to repel said material in said trough and move the same against said apron, and said apron is adapted to remove rough matter from the material, said upper run thereof being inclined upwardly away from said trough to permit smooth objects carried thereon to roll back into said trough while the rough matter is retained thereon.

6. In a machine of the character described, a frame, separating means mounted on said frame, said separating means comprising a ratatable smooth roll and a relatively rough surfaced apron disposed with an end of its upper run adjacent said roll to form a trough for the material, said trough having a discharge space in the bottom thereof, said roll and apron being arranged to move upwardly away from each other with respect to said trough, whereby said roll is adapted to move said material against said apron and said apron is adapted to remove rough matter from said material and return smooth objects to said trough, and adjusting means for shifting said roll laterally into angular relation to said apron, whereby a tapered discharge space is formed therebetween for grading the articles passing therethrough.

7. In a machine of the character described, a stationary main frame, an adjustable frame, separating means mounted thereon including rotatable rolls arranged to form a trough for the material, driving means on said adjustable frame operatively connected to a drive shaft on said main frame to rotate said rolls, said adjustable frame being pivoted on said drive shaft and being adjustable to tilt said rolls longitudinally to incline said trough to different angular positions.

8. In a machine of the character described, a stationary main frame, an adjustable frame, separating means mounted thereon, said separating means including a rotatable roll and an endless apron arranged adjacent said roll to form a trough for the material, driving means on said adjustable frame operatively connected to a drive shaft journalled on said main frame to rotate said roll and move said apron, said adjustable frame being pivoted on said drive shaft to permit said trough to be adjusted to different angular positions lengthwise thereof, and means for adjusting said apron to vary the inclination of its separating surface.

9. In a machine of the character described, a stationary main frame, an adjustable frame, separating means mounted thereon, said separating means including a rotatable roll and an endless apron arranged adjacent said roll to form a trough for the material, driving means on said adjustable frame operatively connected to a drive shaft on said main frame to rotate said roll and move said apron, said adjustable frame being pivoted on said drive shaft, and means on said main frame adapted to engage a part on said adjustable frame to adjust the same about its pivot to tilt said roll and apron and incline said trough to different angular positions.

10. In a machine of the character described, a frame, separating means mounted thereon and including a roll and an endless apron arranged adjacent said roll to form a trough for the material, a pair of countershafts journalled on said frame, a single driving member for rotating said shafts, connections between one of said shafts and said roll for rotating the same, connections between the other counter shaft and said apron for moving the same, said connections between said roll and its counter shaft being adapted to rotate said roll at a higher peripheral speed than the travel of said apron to agitate the material in the trough and throw it upon said apron.

11. In a machine of the character described, a stationary main frame, an adjustable frame on which the separating means are mounted, said separating means including a rotatable roll and an apron arranged adjacent said roll to form a trough for the material, a drive shaft journalled on said main frame, a pair of counter shafts journalled on said adjustable frame extending laterally from said drive shaft in opposite directions, means for rotating said counter shafts from said drive shaft, connections between one of said counter shafts and said roll for rotating the same, and connections between the other counter shaft and said apron for moving the same, and variable speed means for effecting different speeds of said apron relatively to said roll.

12. In a machine of the character described, a frame, separating means including a pair of rotatable rolls arranged side by side to form a trough for the material, one of said rolls being smooth, a relatively rough surfaced apron passing around said other roll and around a roll at a distance outwardly therefrom, and adapted to remove rough matter from the material, bearings for the inner apron roll, an apron tensioning member extending from each of said bearings to said outer roll and a bearing for said outer roll connected with each of said tensioning members, said tensioning members being extensible to vary the distance between said inner and outer apron bearings to take up slack in said apron.

13. In a machine of the character described, a frame, separating means including a pair of rotatable rolls arranged side by side to form a trough for the material, one of said rolls being smooth, a relatively rough surfaced apron passing around said other roll and around a roll at a distance outwardly therefrom and adapted to remove rough matter from the material, bearings for the inner apron roll, a pair of apron tensioning members each having one end pivotally arranged on an end of said inner apron roll and extending to said outer roll, a bearing for said outer roll connected with the outer end of each of said tensioning members, said members being independently extensible to vary the distance between said inner and outer bearings to take up slack in said apron.

14. In a machine of the character described, a frame, separating means including a pair of rotatable rolls arranged side by side to form a trough for the material, an apron passing around said other roll and around a roll at a distance outwardly therefrom, and adapted to remove rough matter from the material, bearings for the inner apron roll, an apron tensioning member extending from each of said bearings to said outer roll, and a bearing for said outer roll swivelled to each of said tensioning members, said tensioning members being extensible to vary the distance between said inner and outer bearings to take up slack in said apron, an adjusting screw arranged adjacent each end of said outer apron rolls and adapted to raise or lower the same to tilt said apron relatively to said trough, and said tensioning members being pivotally arranged on the axis of the inner apron roll to permit such tilting movements.

15. In a machine of the character described, a frame, separating means including a pair of rotatable rolls arranged side by side to form a trough for the material, an apron passing around one of said rolls and around a roll at a distance outwardly therefrom and adapted to remove rough matter from the material, bearings for the inner apron roll, an apron tensioning member extending from each of said bearings to said outer roll and a bearing for said outer roll swivelled to each of said tensioning members, said tensioning members being extensible to vary the distance between said inner and outer bearings to take up slack in said apron, a pair of adjusting screws mounted on said frame adapted to engage the outer end of and support one of said tensioning members, whereby said outer apron roll and its bearings may be raised or lowered by turning said adjusting screws.

16. In a machine of the character described, a frame, separating means including a pair of rotatable rolls arranged side by side to form a trough for the material, an apron passing around one of said rolls and around a roll at a distance outwardly therefrom and adapted to remove rough matter from the material, bearings for said apron rolls, an apron tensioning member which extends between said bearings and which is adjustable to vary the distance between said apron bearings to take up slack in said apron, a pair of adjusting screws mounted on said frame and adapted to engage the outer end of and support one of said tensioning members for raising and lowering the outer apron roll, and means connecting said screws adapted to permit them to turn simultaneously when either one is rotated.

17. In a machine of the character described, a frame, separating means including a pair of rotatable rolls arranged side by side to form a trough for the material, a hopper disposed above said separating trough, and a second pair of rolls in said hopper arranged side by side and between which the material is passed to said separating trough, said second pair of rolls having yielding surfaces adapted to crush some of the foreign matter in said material and permit desirable material to pass between the rolls to said separating means without change.

18. In a machine of the character described, a frame, separating means including a pair of rotatable rolls arranged side by side to form a trough for the material, a hopper disposed above said separating trough, a second pair of rolls in said hopper arranged side by side and in contact between which the material is passed to said separating trough, said second pair of rolls having yielding surfaces adapted to crush some of the foreign matter in said material and permit desirable material to pass between the rolls to said separating means without change, and one of said crushing rolls being resiliently mounted so as to yield when an obstruction enters between said rolls.

19. In a machine of the character described, a frame, separating means including a pair of rotatable rolls arranged side by side to form a trough for the material, a hopper disposed above said separating trough, a second pair of rolls in said hopper arranged side by side and in contact and between which the material passes to said separating trough, said second pair of rolls having yielding surfaces adapted to crush some of the foreign matter in said material and to permit desirable material to pass between said rolls to said separating means without change, and adjustable means for varying the pressure between said crushing rolls, said means including movable bearings for one of said rolls, adjusting rods connected to said bearings and to eccentrics on said hopper, and means for rotating said eccentrics to shift said movable bearings.

20. In a machine of the character described, a frame, separating means including a pair of rotatable rolls arranged side by side to form a trough for the material, a hopper disposed above said separating trough, a second pair of rolls in said hopper arranged side by side in contact and between which the material passes to said separating trough, said second pair of rolls having yielding surfaces adapted to crush some of the foreign matter in said material and to permit desirable material to pass between said rolls to said separating means without change, and adjustable means for varying the pressure between said crushing rolls, said means including movable bearings for one of said rolls, adjusting rods connected to said bearings and to eccentrics on said hopper, means for rotating said eccentrics to shift said movable bearings, a drive shaft journalled on said frame and driving connections between said drive shaft said separating means and said crushing rolls.

FRANK A. RAPPLEYE.